Patented Aug. 8, 1933

1,921,756

UNITED STATES PATENT OFFICE 1,921,756

RESINOUS COMPOSITION

Roy H. Kienle, Schenectady, N. Y., assignor to General Electric Company, a Corporation of New York No Drawing. Application October 26, 1927
Serial No. 228,975

10 Claims. (Cl. 260—8)

The present invention relates to the class of resinous compositions, known as alkyd resins, which are formed by the chemical interaction of a polyhydric alcohol and a polybasic acid.

It is the object of my invention to produce improved resinous compositions the properties of which render them particularly adaptable for certain industrial uses. For example, my improved resins are suited particularly for coating wires and sheet metal because of their high flexibility and water resistivity. They are also capable of being used advantageously in molded compositions and for making laminated products, such as mica plates which are made up of mica splittings.

In the alkyd resins made in accordance with my invention, polyhydric alcohol is replaced in part by monohydric alcohol. For example, in a resin made by the chemical interaction of glycerine and a polybasic acid, part of the glycerine may be replaced with either amyl alcohol, butyl alcohol, borneol, diacetone alcohol, allyl alcohol or other monohydric alcohols; or part of the glycerine may be replaced by a substance, such as phenol, which exhibits the properties of a monohydric alcohol in the chemical reactions taking place in the present invention. The polybasic acid may, or may not be replaced in part by a monobasic acid. It is necessary in the preparation of the new products embraced in my invention that the monohydric alcohol shall be caused to react first with polybasic acid before polyhydric alcohol is caused to take part in the reaction.

My invention may be illustrated by the following specific examples.

*First Example.*—Two hundred and eighty-five parts of phthalic anhydride and forty parts by weight of butyl alcohol are heated to a reaction temperature until combination occurs. Heating to about 160° C. for about one-half hour ordinarily will suffice. One hundred parts of glycerine by weight then are added and the mixture is heated at about 200 to 220° C. until resinification occurs. The product is a clear transparent resin in which the butyl radical, $C_4H_9$, together with the glycerine radical,

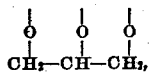

is in chemical combination with the phthalic acid radical $C_8H_4O_2$.

*Second Example.*—Three hundred parts of phthalic anhydride and sixty-five parts by weight of amyl alcohol are heated to 160° C. for about one half hour. One hundred parts of glycerine by weight then are added and the mixture heated to about 200–220° C. until on cooling a small sample of the mixture upon a metal plate sets to a non-tacky solid. The product, as above, is a clear, transparent resin in which the amyl radical, $C_5H_{11}$, together with the glycerine radical is in chemical combination with the phthalic acid radical.

The resins produced in accordance with either example are fusible and soluble in organic solvents, such for example as acetone, ethyl acetate, alcohol (denatured) benzol mixture or monoethyl ether glycol. They may be rendered infusible and insoluble by heating to moderately elevated temperatures, say to about 150° to 200° C. for several hours.

While the above proportions are illustrative only and may be varied considerably in carrying out my invention, the proportion of monohydric alcohol relative to the polyhydric alcohol should not be so great that a resinous material will not result from the condensation reaction and preferably the amount of monohydric alcohol should not be so great as to prevent conversion of the resulting resin from the fusible, soluble sol state to the infusible, insoluble gel state. In my opinion, the chemical reaction which takes place involves the polyhydric and the monohydric alcohols forming a complex ester with the polybasic acid which thereupon by the loss of water forms heavier molecular complexes and finally results in the formation of a resin. The same type of reaction occurs when part of the polybasic acid is replaced by a monobasic acid. For example, I have prepared resins embodying my present invention replacing the polybasic acid in part with oleic acid. Various polyhydric alcohols may be used within the scope of my invention. In fact, mixtures of polyhydric alcohols, for example, glycol and glycerine may be caused to react with a polybasic acid together with mixtures of monohydric alcohols such as butyl and ethyl alcohols. In place of phthalic anhydride other polybasic acids, such as succinic acid, maleic acid, fumaric acid, citric acid, sebacic acid, tartaric acid, oxalic acid, or a mixture of such acids may be employed.

When an ester formed by the combination of a monohydric alcohol with phthalic acid is added as a mixture to an alkyd resin turbidity results when the amount of the phthalate ester exceeds about 25 to 30% of the resin by weight. No such turbidity results when the monohydric alcohol is combined with phthalic acid together with a polyhydric alcohol in accordance with my invention, indicating that the monohydric alcohol becomes a part of the resin molecule rather than being held physically dispersed within the mass of the resin. Furthermore, the monohydric alcohol can not be removed by the use of solvents from the resin made in accordance with my invention either alone as such alcohol or in combination as a phthalate.

What I claim as new and desire to secure by Letters Patent of the United States is:

1. A resin resulting from the chemical interaction of a polyhydric alcohol, a monohydric alcohol and an organic polybasic acid which resin is heat-convertible to the infusible state.

2. A fusible, soluble resin formed by the condensation of a polyhydric alcohol, a monohydric alcohol, and one or more carboxylic organic acids at least one of which is a polybasic acid, said resin being capable of being rendered infusible and insoluble by heating.

3. A soluble resinification product of glycerine, phthalic anhydride and a monohydric alcohol which product is heat-convertible to the infusible state.

4. A soluble resinification product of glycerine, phthalic anhydride and butyl alcohol which product is heat-convertible to the infusible state.

5. A fusible, soluble resin which is formed by heating to resinification glycerine, phthalic anhydride and a monohydric alcohol, the proportions of said ingredients being chosen to impart to said resin the property of being heat-convertible to the infusible, insoluble state.

6. A fusible, soluble resin which is heat convertible to the infusible, insoluble state formed by heating to resinification glycerine, phthalic anhydride and a monohydric alcohol, the proportion of glycerine by weight preponderating over the monohydric alcohol.

7. A soluble resinification product of glycerine, phthalic anhydride and amyl alcohol which product is heat-convertible to the infusible state.

8. A resin resulting from the chemical interaction of a polyhydric alcohol, amyl alcohol and an organic polybasic acid which resin is heat-convertible to the infusible state.

9. A resin resulting from the chemical interaction of a polyhydric alcohol, butyl alcohol and an organic polybasic acid which resin is heat-convertible to the infusible state.

10. A resin resulting from the chemical interaction of glycerine, phthalic anhydride and a monohydric alcohol which resin is heat-convertible to the infusible state.

ROY H. KIENLE.